(12) United States Patent
Peterson

(10) Patent No.: US 7,901,137 B1
(45) Date of Patent: Mar. 8, 2011

(54) BEARING ASSEMBLY, AND BEARING APPARATUS AND MOTOR ASSEMBLY USING SAME

(75) Inventor: Steven Barrett Peterson, Orem, UT (US)

(73) Assignee: US Synthetic Corporation, Orem, UT (US)

( * ) Notice: Subject to any disclaimer, the term of this patent is extended or adjusted under 35 U.S.C. 154(b) by 322 days.

(21) Appl. No.: 12/008,526

(22) Filed: Jan. 11, 2008

(51) Int. Cl.
*F16C 31/00* (2006.01)

(52) U.S. Cl. ............. 384/92; 384/95; 384/284; 384/285; 175/403; 175/432

(58) Field of Classification Search .................... 384/92, 384/95, 282, 284, 285; 175/403, 432; 299/108
See application file for complete search history.

(56) References Cited

U.S. PATENT DOCUMENTS

| | | | | |
|---|---|---|---|---|
| 2,506,387 | A | * | 5/1950 | Ross ........................ 175/405.1 |
| 4,410,054 | A | * | 10/1983 | Nagel et al. .................. 175/107 |
| 4,462,638 | A | * | 7/1984 | DenBesten et al. ........... 299/104 |
| 5,092,687 | A | * | 3/1992 | Hall .............................. 384/303 |
| 5,480,233 | A | | 1/1996 | Cunningham |
| 7,703,982 | B2 | * | 4/2010 | Cooley ........................... 384/95 |

* cited by examiner

*Primary Examiner* — David J Bagnell
*Assistant Examiner* — Sean Andrish
(74) *Attorney, Agent, or Firm* — Workman Nydegger

(57) ABSTRACT

Embodiments of present invention relate to a bearing assembly, and a bearing apparatus and motor assembly that employs such a bearing assembly. In one embodiment of the present invention, a bearing assembly comprises a support ring including a plurality of recesses and at least one opening. The bearing assembly further includes a plurality of bearing elements, each of which is positioned generally within a corresponding one of the recesses. At least one of the bearing elements includes at least one groove. At least one retention element may be positioned generally within the at least one opening and adjacent to the at least one groove. Further embodiments of the present invention are directed to a thrust-bearing apparatus, a radial bearing apparatus, and a downhole motor that may utilize any of the disclosed thrust-bearing assemblies and radial bearing assemblies.

20 Claims, 12 Drawing Sheets

US 7,901,137 B1

BEARING ASSEMBLY, AND BEARING APPARATUS AND MOTOR ASSEMBLY USING SAME

BACKGROUND

Conventional thrust-bearing apparatuses and radial bearing apparatuses may comprise bearing elements including bearing surfaces that at least partially contact and move or slide relative to one another during use. Such bearing elements may include a superhard material (e.g., polycrystalline diamond) for resisting wear during use of the bearing apparatus.

One application for bearing apparatuses is in a subterranean drilling system configured to drill a borehole into a subterranean formation for oil or gas exploration. In a typical subterranean drilling system, a downhole drilling motor is suspended at the lower end of a drill string of drill pipe comprising a series of connected pipe sections. A rotary drill bit (e.g., a fixed cutter drill bit, roller cone drill bit, a reamer, etc.) may be supported below the drilling motor (via pipe sections, drill collars, or other structural members) or may be directly connected to the downhole motor. Drilling fluid (also commonly known as drilling mud) may be circulated through the drill string and the downhole drilling motor to generate torque therewithin to rotate the rotary drill bit and drill a borehole in the subterranean formation. During drilling, the drilling fluid may be returned to the surface through the annular space between the drilled borehole and the drill string and may carry the cuttings of the subterranean formation to the surface. Thrust-bearing apparatuses may be employed in the subterranean drilling system for carrying thrust loads generated during the drilling process.

Radial bearing apparatuses are used in conventional downhole drilling components, such as roller cones. Such radial bearing apparatuses include an inner and outer race, each of which may include a plurality of superhard bearing elements (e.g., polycrystalline diamond compacts). The races are positioned adjacent one another so that bearing surfaces of the bearing elements contact one another during use. For example, the inner race may be mounted or affixed to a spindle of a roller cone and the outer race may be affixed to an inner bore formed within the roller cone to enable rotation of the roller cone.

SUMMARY

Embodiments of present invention relate to a bearing assembly, and a bearing apparatus and motor assembly that employs such a bearing assembly. In one embodiment of the present invention, a bearing assembly comprises a support ring including a plurality of recesses and at least one opening. The bearing assembly further includes a plurality of bearing elements, each of which is positioned generally within a corresponding one of the recesses. At least one of the bearing elements includes at least one groove. At least one retention element may be positioned generally within the at least one opening and adjacent to the at least one groove.

Further embodiments of the present invention are directed to a thrust-bearing apparatus, a radial bearing apparatus, and a downhole motor that may utilize any of the disclosed thrust-bearing assemblies and radial bearing assemblies.

BRIEF DESCRIPTION OF THE DRAWINGS

The drawings illustrate several embodiments of the present invention, wherein like reference numerals refer to like or similar elements in different views or embodiments shown in the drawings.

DETAILED DESCRIPTION

Embodiments of present invention relate to a bearing assembly, and a bearing apparatus and motor assembly that employs such a bearing assembly. The disclosed embodiments of bearing assemblies may include a support ring, a plurality of bearing elements, and a plurality of retention elements that retain the bearing elements on the support ring. For example, at least one retention element may be a pin or a threaded fastener that extends through or abuts at least one of the bearing elements.

Figure 1:
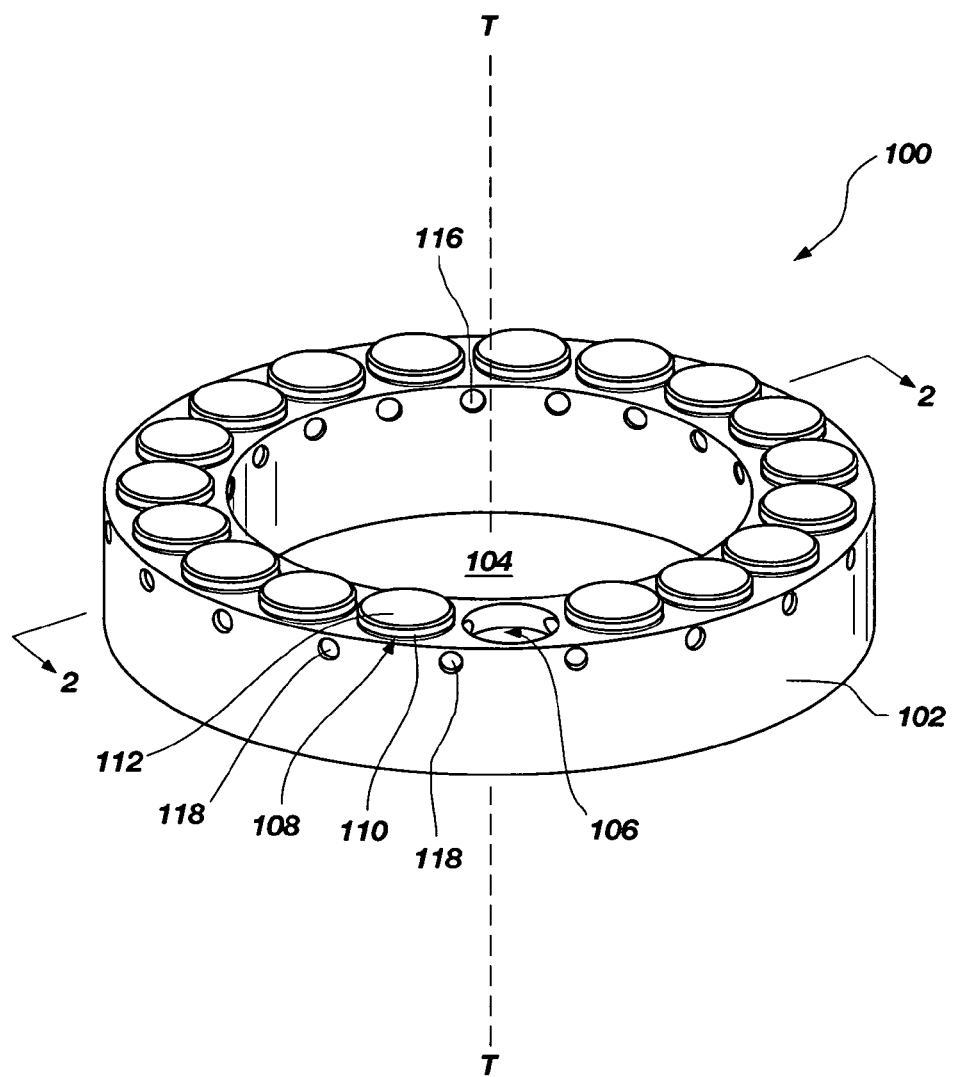
FIG. 1 is an isometric view of a thrust-bearing assembly, with one of the bearing elements removed, according to one embodiment of the present invention.
Figure 2:
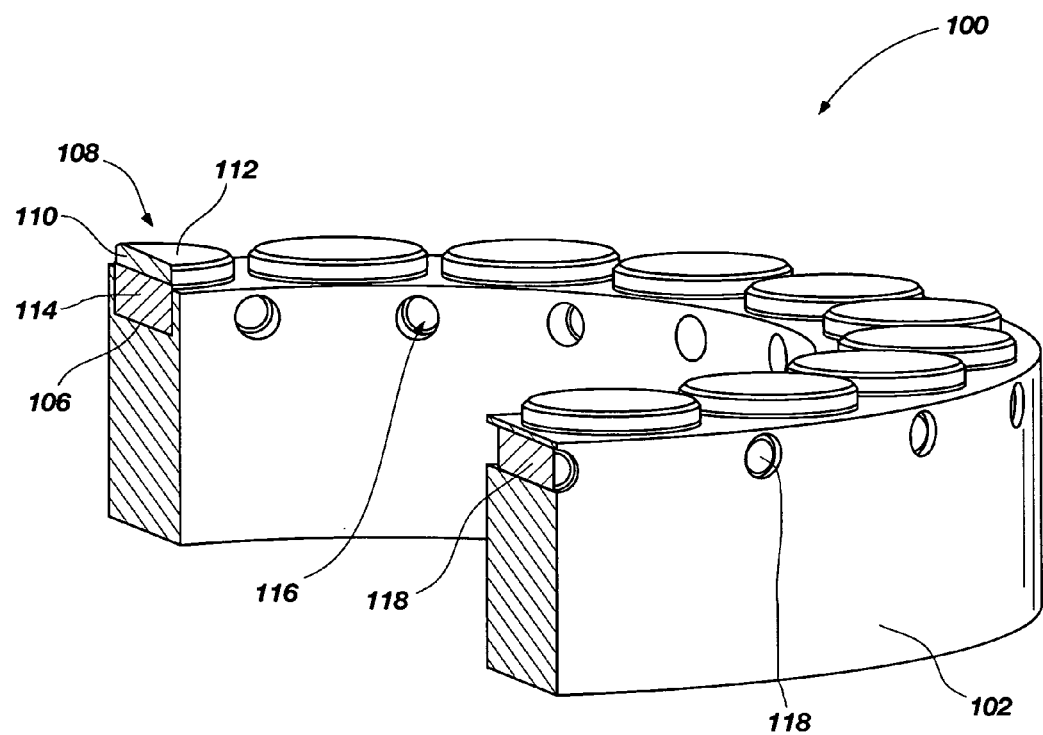
FIG. 2 is an isometric partial cross-sectional view taken along line 2-2 of the thrust-bearing assembly shown in FIG. 1.

FIG. 1 is an isometric view of a thrust-bearing assembly 100 according to one embodiment of the present invention and FIG. 2 is an isometric partial cross-sectional view taken along line 2-2 of the thrust-bearing assembly 100 shown in FIG. 1. The thrust-bearing assembly 100 includes a support ring 102 that defines an opening 104 generally centered about a thrust axis T along which thrust may be applied during use. The opening 104 may be used for receiving, for example, a shaft of a downhole motor. The support ring 102 may comprise a metallic material (e.g., steel) or may comprise a more wear resistant material, such as a cemented tungsten carbide, silicon carbide, or another more wear-resistant material.

With continued reference to FIGS. 1 and 2, the support ring 102 includes a plurality of circumferentially-spaced bearing-element recesses 106, with a bearing element 108 inserted into each bearing-element recess 106. Only one bearing-element recess 106 is shown in FIG. 1 without a corresponding bearing element 108 positioned therein to reveal the configuration of the bearing-element recesses 106. Each bearing element 108 may be configured as a superhard compact that comprises a superhard table 110 including a bearing surface 112, with the superhard table 110 bonded to a substrate 114 (See FIG. 2). The term "superhard," as used herein, means a material having a hardness exceeding a hardness of tungsten carbide. For example, the superhard table 110 may comprise polycrystalline diamond, polycrystalline cubic boron nitride, polycrystalline cubic boron nitride and polycrystalline diamond, a diamond-silicon carbide composite, or any other suitable superhard material. The substrate 114 may comprise cobalt-cemented tungsten carbide or another suitable cemented-carbide substrate. However, in other embodiments of the present invention, the bearing element 108 may be fabricated from a unitary piece of superhard material.

Still referring to FIGS. 1 and 2, the support ring 102 further includes a plurality of circumferentially-spaced retention-element openings 116 that may extend radially through the support ring 102. In the illustrated embodiment, one retention-element opening 116 is located between adjacent bearing elements 108 and extends completely through a radial portion of the support ring 102 (i.e., a radial through hole). However, in other embodiments of the present invention, each retention-element opening 116 may be a blind hole that extends only partially through a radial portion of the support ring 102. A retention element 118 is inserted into each retention-element opening 116 and configured to retain the bearing elements 108 on the support ring 102. For example, as will be discussed in more detail below, a respective retention element 118 may exhibit an interference fit (e.g., a force fit or shrink fit) with respect to a corresponding bearing element 108, the support ring 102, or both. Each retention element 118 may be configured as a pin (e.g., a steel pin) having a selected cross-sectional geometry or another suitable configuration, with a cross-sectional dimension (e.g., a diameter) selected to result in an interference fit with at least the adjacent bearing elements 108 that the retention element 118 is positioned between. In some embodiments of the present invention, each retention element 118 may be interference fit with the support ring 102.

Figure 3:
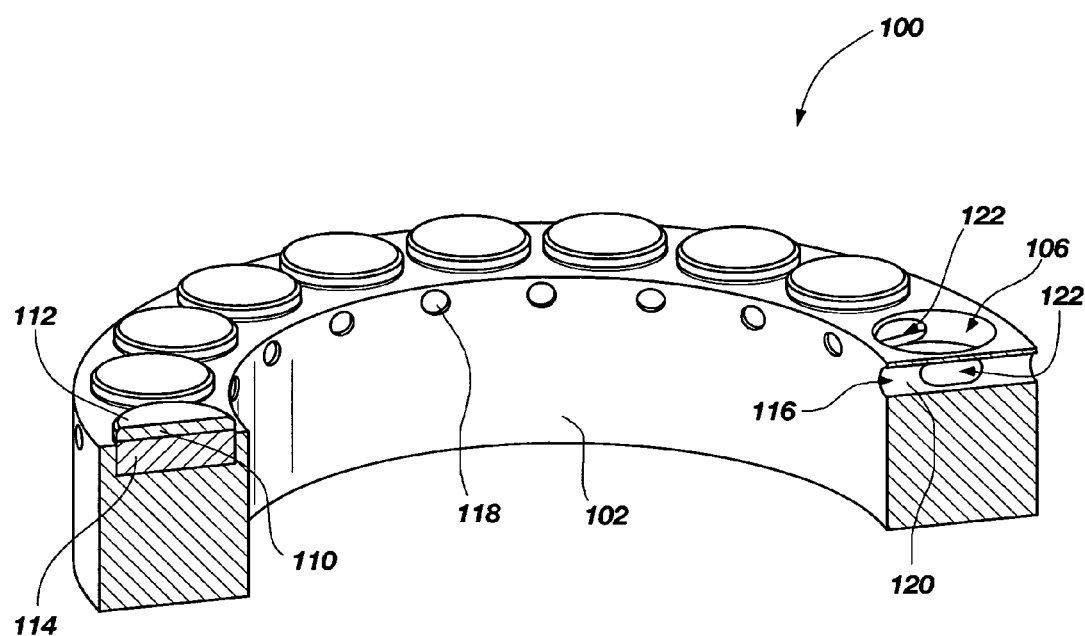
FIG. 3 is the isometric partial cross-sectional view shown in FIG. 2, with one of the retention elements and one of the bearing elements removed to illustrate the configuration of the retention-element openings, slots, and bearing-element recesses.
Figure 4:
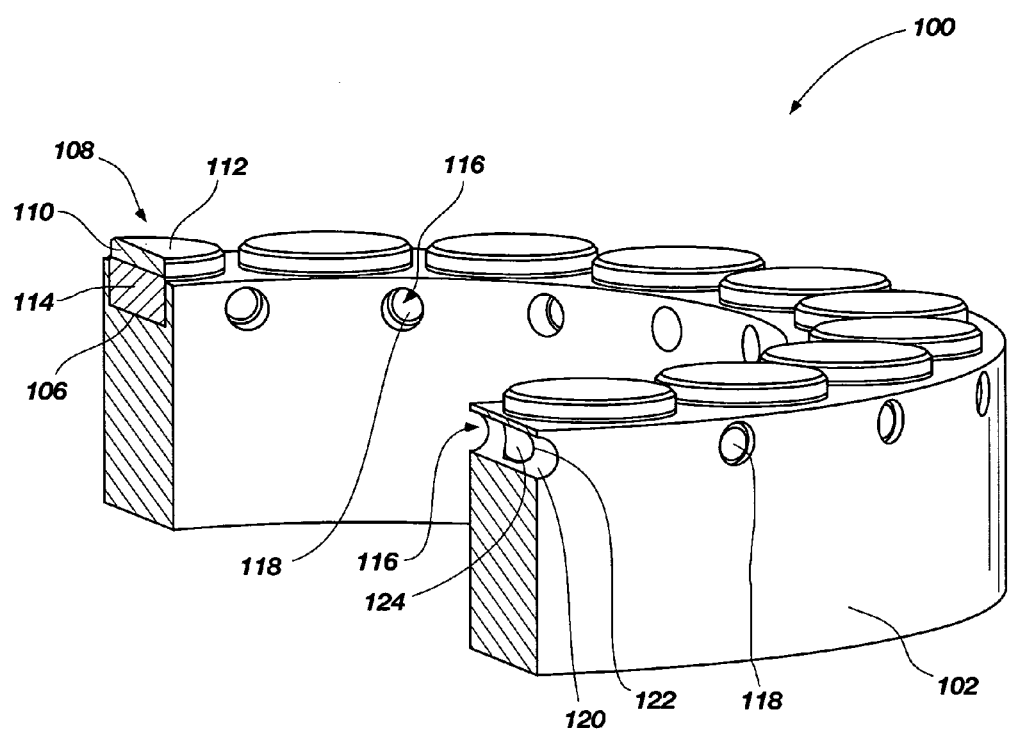
FIG. 4 is an isometric partial cross-sectional view taken along line 2-2 of the thrust-bearing assembly shown in FIG. 1, with one of the retention elements removed to illustrate how each bearing element includes a groove in substantial registry with an adjacent retention-element opening.

FIGS. 3 and 4 are each isometric partial cross-sectional views that illustrate the configuration of the retention-element openings 116 and bearing-element recesses 106 in more detail. Each retention-element opening 116 is defined by an interior surface 120 including a slot 122 formed therethrough. The slot 122 provides access to a respective one of the bearing elements 108 positioned within an adjacent bearing-element recess 106. Each slot 122 may be formed by machining the retention-element opening 116 in the support ring 102 so that an imaginary surface that lies on the interior surface 120 overlaps with an imaginary surface that lies on an interior surface that partially defines an adjacent bearing-element recess 106. Referring to FIG. 4, each bearing element 108 includes two laterally-extending grooves 124 (only one of the grooves 124 shown in FIG. 4), with one of the grooves 124 exposed through an adjacent slot 122 and oriented to be substantially in registry with an adjacent retention-element opening 116.

Figure 5:
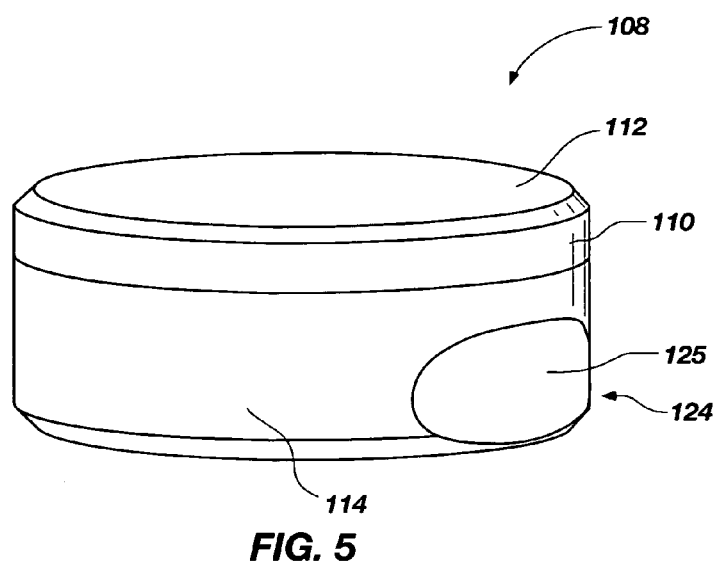
FIG. 5 is an isometric view of one of the bearing elements shown in FIGS. 1-4.
Figure 6:
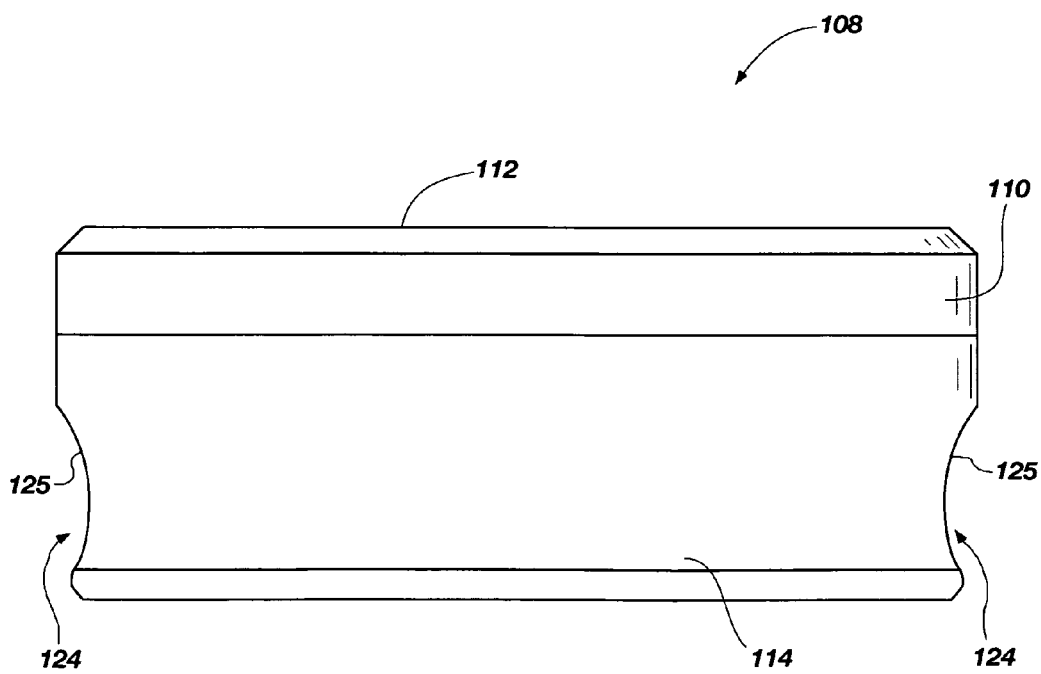
FIG. 6 is a side elevation view of the bearing element shown in FIG. 5.

A more detailed view of one of the bearing elements 108 is shown in the isometric view of FIG. 5 and the side elevation view of FIG. 6. Referring to FIGS. 5 and 6, the substrate 114 of each bearing element 108 may include two laterally-extending grooves 124 defined by respective groove surfaces 125. Each groove 124 of one of the bearing elements 108 may be substantially aligned with a respective one of the retention-element openings 116 (FIG. 4) when the bearing element 108 is positioned in one of the bearing-element recesses 106.

Figure 7:
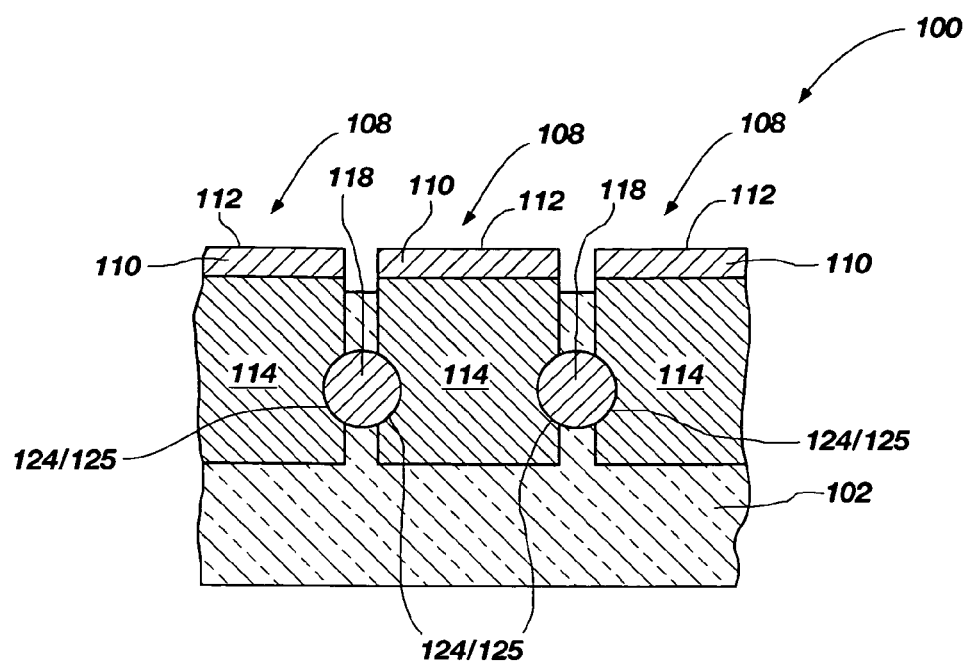
FIG. 7 is a partial cross-sectional view of the thrust-bearing assembly shown in FIG. 1.

The position of the retention elements 118 in relation to the bearing elements 108 is best understood with reference to the partial cross-sectional view of the thrust-bearing assembly shown in FIG. 7. Each retention element 118 may be interference fit (e.g., a force fit or a shrink fit) with one of the groove surfaces 125 of one bearing element 108 and one of the groove surfaces 125 of a circumferentially-adjacent one of bearing elements 108. Attempted movement of each bearing element 108 in a direction generally parallel to the thrust axis T may be restricted due to the interference fit and/or as a result of physical interference between the groove surface 125 thereof and a corresponding retention element 118. Employing an interference fit between the retention elements 118 and at least the bearing elements 108 may enable the bearing elements 108 to be retained on the support ring 102 without brazing the bearing elements 108 to the support ring 102, which can damage temperature-sensitive superhard materials that may be used in the bearing elements 108.

Figure 8:
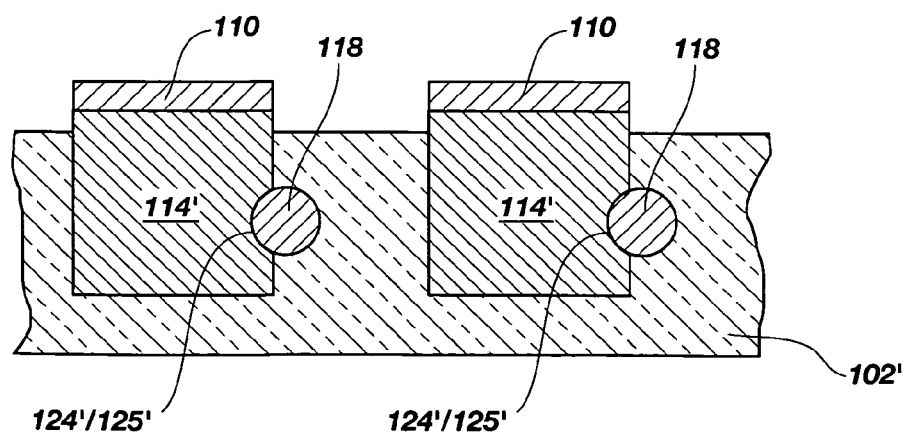
FIG. 8 is a partial cross-sectional view of a thrust-bearing assembly according to another embodiment of the present invention.

In the illustrated embodiment, each retention element 118 may be interference fit with two circumferentially-adjacent bearing elements 108. However, in other embodiments of the present invention, each retention element 118 may be interference fit with one of the bearing elements 108 or none of the bearing elements 108. For example, referring to FIG. 8, in one embodiment of the present invention, a substrate 114' of each bearing element 108' may include only one laterally-extending groove 124' having a groove surface 125' that is interference fit with one of the retention elements 118.

Figure 9A:
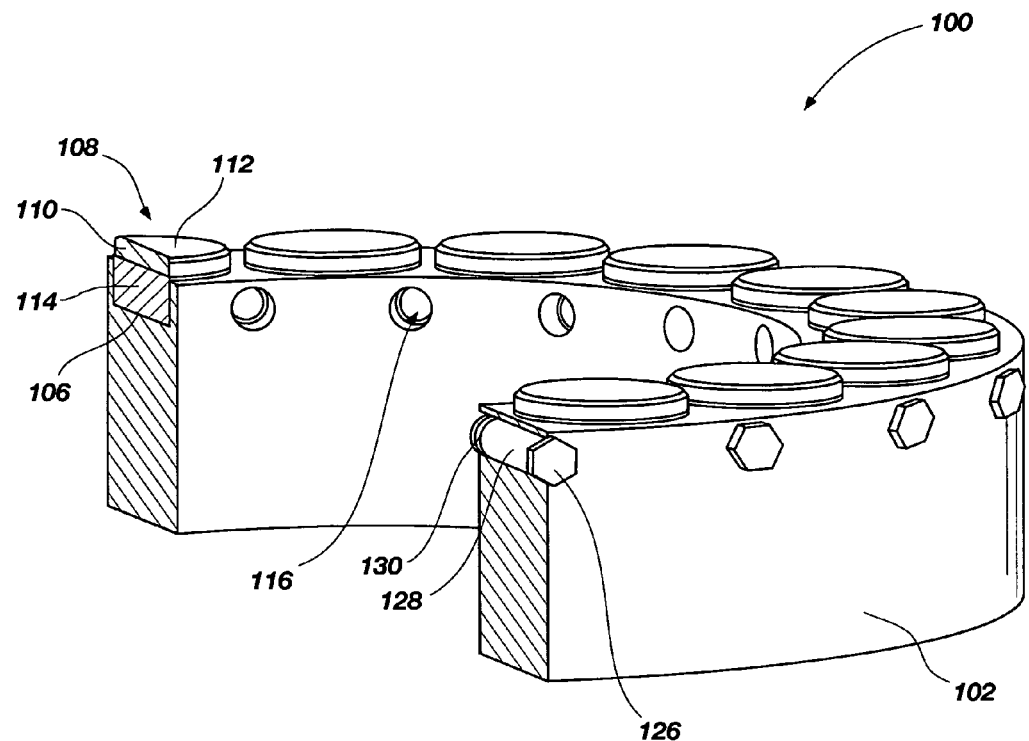
FIG. 9A is an isometric partial cross-sectional view of the thrust-bearing assembly shown in FIG. 2, with each retention element configured as a fastener according to another embodiment of the present invention.
Figure 9B:
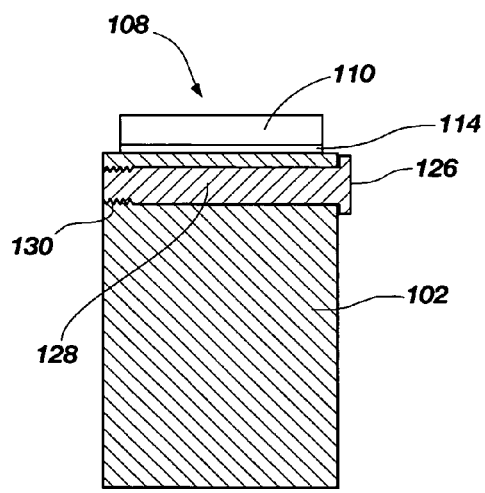
FIG. 9B is a cross-sectional view of the thrust-bearing assembly shown in FIG. 9A taken longitudinally through one of the fasteners.

In any of the previously described embodiments of the present invention, a portion of or all of the retention elements 118 may be configured as a threaded fastener. In such an embodiment, the threaded fastener may not generally exhibit an interference fit. For example, FIG. 9A is an isometric partial cross-sectional view of the thrust-bearing assembly 100 shown in FIG. 2, with each retention element 118 configured as a fastener 126, and FIG. 9B is a cross-sectional view of the thrust-bearing assembly shown in FIG. 9A taken longitudinally through one of the fasteners 126. Each fastener 126 may include a shank portion 128 without threads and a threaded portion 130 configured to engage a complementarily threaded portion formed in the support ring 102. Optionally, when fastened, the shank portion 128 may mate with the groove surface 125 (not shown, see FIGS. 5 and 6) of the substrate 114 and the threaded portion 130 threadly engages the support ring 102. Attempted movement of each bearing element 108 in a direction generally parallel to the thrust axis T results in physical interference between the groove surface 125 (not shown) thereof and a corresponding fastener 126 thereby resulting in the bearing elements 108 being retained on the support ring 102.

Figure 10:
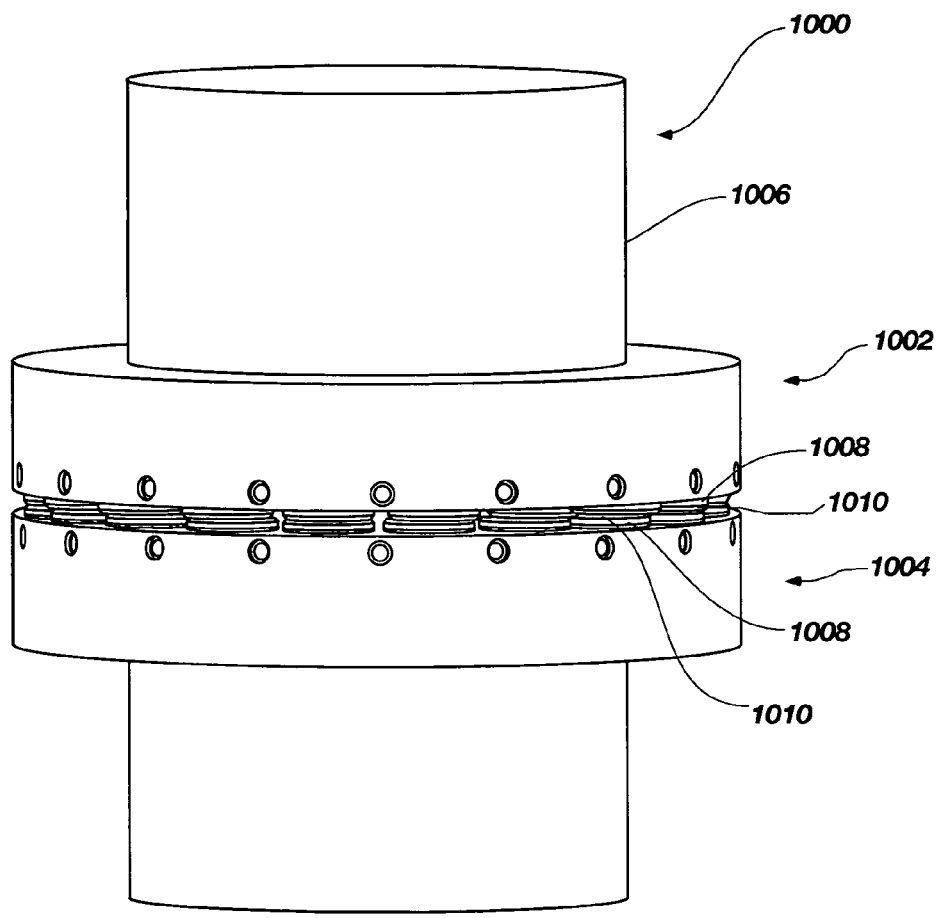
FIG. 10 is an isometric view of one embodiment of a thrust-bearing apparatus that may employ any of the disclosed embodiments of thrust-bearing assemblies.

Any of the described thrust-bearing assembly embodiments may be employed in a thrust-bearing apparatus. A thrust-bearing apparatus may include, for example, at least one thrust-bearing assembly configured as the thrust-bearing assembly shown in FIG. 1. FIG. 10 is an isometric view of a thrust-bearing apparatus 1000 according to one embodiment of the present invention. The thrust-bearing apparatus 1000 includes thrust-bearing assemblies 1002 and 1004, at least one of which may be configured as any of the previously described embodiments of thrust-bearing assemblies (See FIGS. 1-9B). In the illustrated embodiment, the thrust-bearing assemblies 1002 and 1004 are each configured as the thrust-bearing assembly 100 shown in FIG. 1. However, in other embodiments, one of the thrust-bearing assemblies 1002 and 1004 may be conventional in construction.

Still referring to FIG. 10, the thrust-bearing assembly 1002 may be coupled to a shaft 1006 of an apparatus (e.g., a downhole motor) via a press fit, shrink fit, threaded coupling, or another suitable connection. Thus, in the illustrated embodiment, the thrust-bearing assembly 1002 may be referred to as a rotor because the thrust-bearing assembly 1002 rotates when the shaft 1006 rotates. The thrust-bearing assembly 1004 may remain stationary and, thus, may be referred to as a stator. The thrust-bearing assemblies 1002 and 1004 each include a plurality of bearing elements 1008 with respective bearing surfaces 1010. The bearing surfaces 1010 of the thrust-bearing assembly 1002 and the bearing surfaces 1010 of the thrust-bearing assembly 1004 oppose and bear against each other during use.

Figure 11:
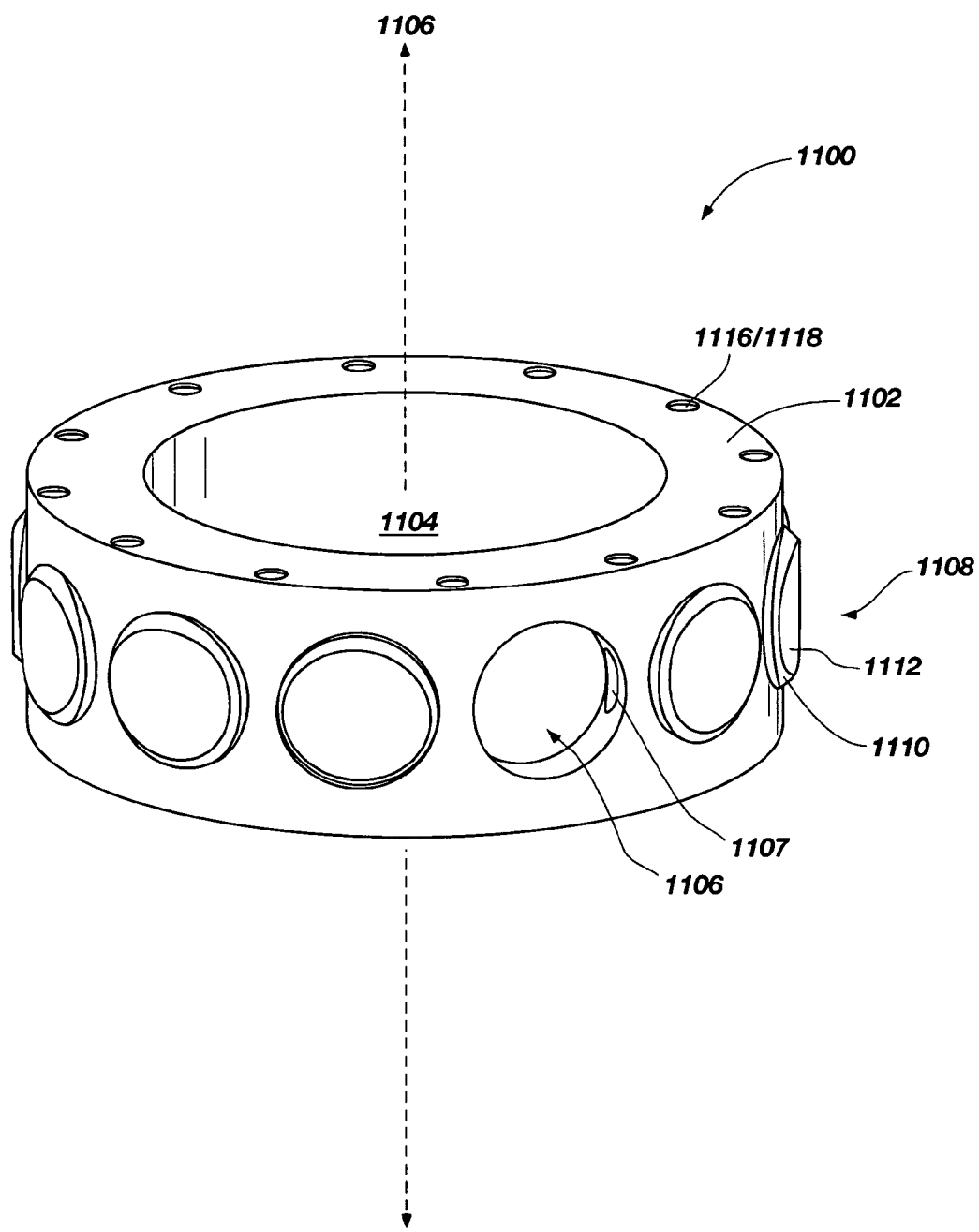
FIG. 11 is an isometric view of a radial bearing assembly according to another embodiment of the present invention.

The principles discussed above for thrust-bearing assemblies may also be employed in radial bearing assemblies. FIG. 11 is an isometric view of a radial bearing assembly 1100 that includes a support ring 1102 defining an aperture 1104 generally centered about a central axis 1106. The support ring 1102 includes a plurality of circumferentially-spaced bearing-element recesses 1106. Only one of the recesses 1106 is shown in FIG. 11 without a bearing element 1108 positioned therein. Each bearing element 1108 is positioned generally within a corresponding bearing-element recess 1106. Each bearing element 1108 may be configured as a superhard compact as previously described with respect to the bearing elements 108 shown in FIGS. 1 and 2. For example, in the illustrated embodiment, each bearing element 1108 comprises a superhard table 1110 (e.g., a polycrystalline diamond table) including a concavely-curved bearing surface 112. The superhard table 1110 may be bonded to a substrate 1114 (See FIG. 11), such as a cobalt-cemented tungsten carbide substrate.

Still referring to FIG. 11, the support ring 1102 further includes a plurality of circumferentially-spaced retention-element openings 1116 that may extend completely or partially through a thickness direction (i.e., generally parallel to the central axis 1106). In the illustrated embodiment, each retention-element opening 1116 is positioned between adjacent bearing-element recesses 1106 and each bearing-element recess 1106 is in communication with an adjacent retention-element opening 1116 via a slot 1107 (only one slot 1107 is shown in FIG. 11). A retention element 1118 (e.g., a steel pin) may be inserted into each retention-element opening 1116. Optionally, respective retention elements 1118 may exhibit an interference fit (e.g., a press fit or a shrink fit) with at least one adjacent bearing element 1108, the support ring 1102, or both.

Figure 12:
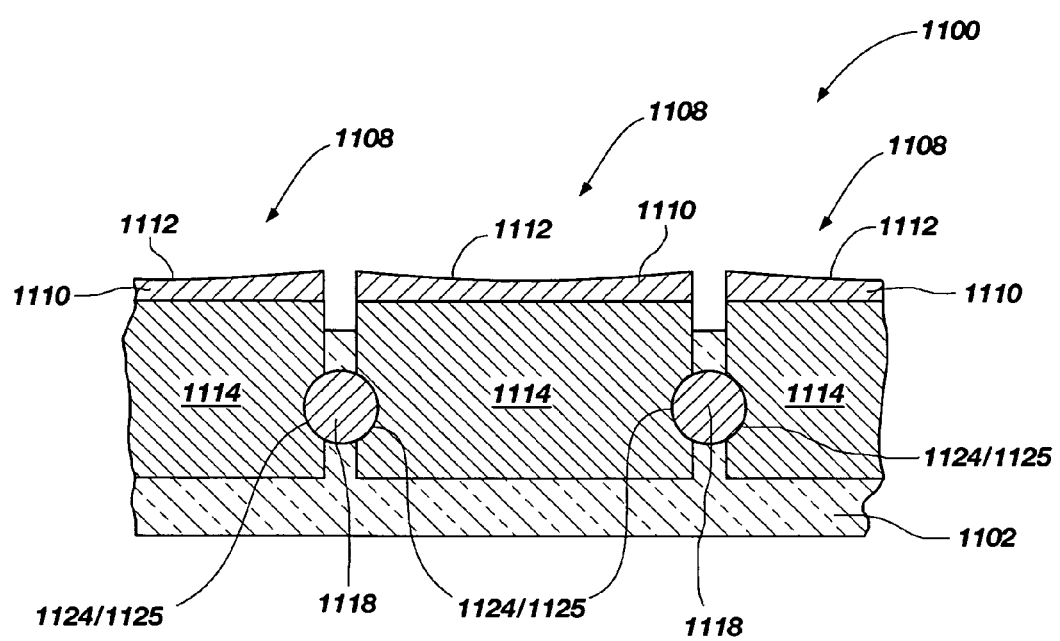
FIG. 12 is a partial cross-sectional view of the radial bearing assembly shown in FIG. 11.

Referring to FIG. 12, in a manner similar to the bearing elements 108 of the thrust-bearing assembly 100 shown in FIG. 1, each bearing element 1108 may include two grooves 1124 defined by respective groove surfaces 1125 that may be formed in the substrate 1114 and extend laterally therethrough. A groove surface 1125 of each groove 1124 of one bearing element 1108 is exposed through a corresponding slot 1107 (FIG. 11) so that one of the retention elements 1118 may be interference fit therewith. For example, each retention element 1118 may be interference fit with the groove surface 1125 of one bearing element 1108 and the groove surface 1125 of another one of the bearing elements 1108. However, as with the previously described thrust-bearing assemblies, in other embodiments, each retention element 1118 may be interference fit with one bearing element 1108 (or no bearing element 1108) and, in further embodiments, each bearing element 1108 may only be interference fit with one retention element 1118. Additionally, as with the previously described embodiments of thrust-bearing assemblies, a portion of or all of the retention elements 1118 may be configured as a threaded fastener (e.g., the fastener 128 shown in FIGS. 9A and 9B) that is threadly connected to the support ring 1114.

Figure 13:
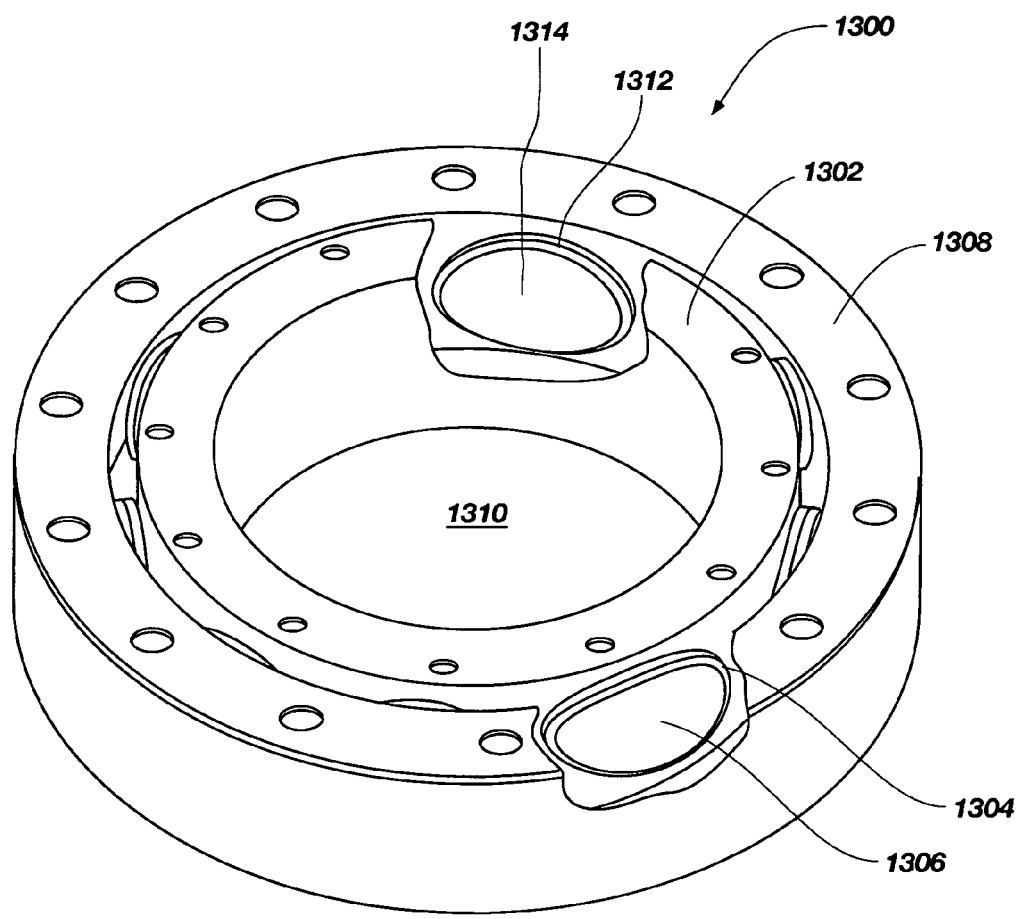
FIG. 13 is an isometric view of one embodiment of a radial bearing apparatus that may employ any of the disclosed embodiments of radial bearing assemblies.

The disclosed radial bearing assemblies may be used in radial bearing apparatuses. For example, FIG. 13 is a radial-bearing apparatus 1300 according to one embodiment of the present invention. The radial-bearing apparatus 1300 includes an inner race or rotor 1302 that is shown configured as the radial bearing assembly 1100 shown in FIG. 11. The inner race 1302 includes a number of bearing elements 1304 with concave (e.g., cylindrically curved) bearing surfaces 1306. The inner race 1302 may be coupled to a shaft of, for example, a downhole motor by press fitting, shrink fitting, threadly coupling, or another suitable connection. The radial bearing apparatus 1300 further includes an outer race or stator 1308 that defines an aperture 1310 and receives the inner race 1302. The outer race 1308 may include a number of bearing elements 1312 with convex bearing surfaces 1314 curved (e.g., cylindrically curved) to correspond to the curvature of the concave bearing surfaces 1306 of the inner race 1302. The outer race 1308 may be configured similarly to the inner race 1302. Namely, the outer race 1308 may employ retention elements (e.g., interference-fit pins or threaded fasteners) inserted through openings formed in a support ring and grooves formed in the bearing elements 1312 in order to secure the bearing elements 1312. The terms "rotor" and "stator" refer to rotating and stationary components of a radial-bearing apparatus, respectively. Thus, if the outer race 1308 is configured to remain stationary, the outer race 1308 may be referred to as the stator and the inner race 1302 may be referred to as the rotor.

Still referring to FIG. 13, the inner race 1302 and the outer race 1308 are assembled together so that the bearing surfaces 1306 of the inner race 1302 and the opposing bearing surfaces 1314 of the outer race 1308 may bear against each other and move relative to each other as the inner race 1302 rotates.

The radial-bearing apparatus 1300 may be employed in a variety of different mechanical applications. For example, so-called "roller cone" rotary drill bits may benefit from one of the radial bearing apparatuses disclosed herein. More specifically, the inner race 1302 may be mounted or affixed to a spindle of a roller cone and the outer race 1308 may be affixed to an inner bore formed within the roller cone and that such an outer race 1308 and inner race 1302 may be assembled to form a radial bearing apparatus similar to the radial bearing apparatus 1300.

It is noted, that in some embodiments of the present invention, a number of bearing elements of a bearing assembly (e.g., a thrust-bearing assembly or radial bearing assembly) may be conventional in construction and retained on a support ring in a conventional manner, such as by brazing or press-fitting the bearing elements with the support ring, while one or more of the bearing elements may be retained on the support ring in accordance with principles of embodiments described herein (e.g., press-fitting a pin with a bearing element and/or a support ring, or threadly coupling a fastener to the support ring).

Figure 14:
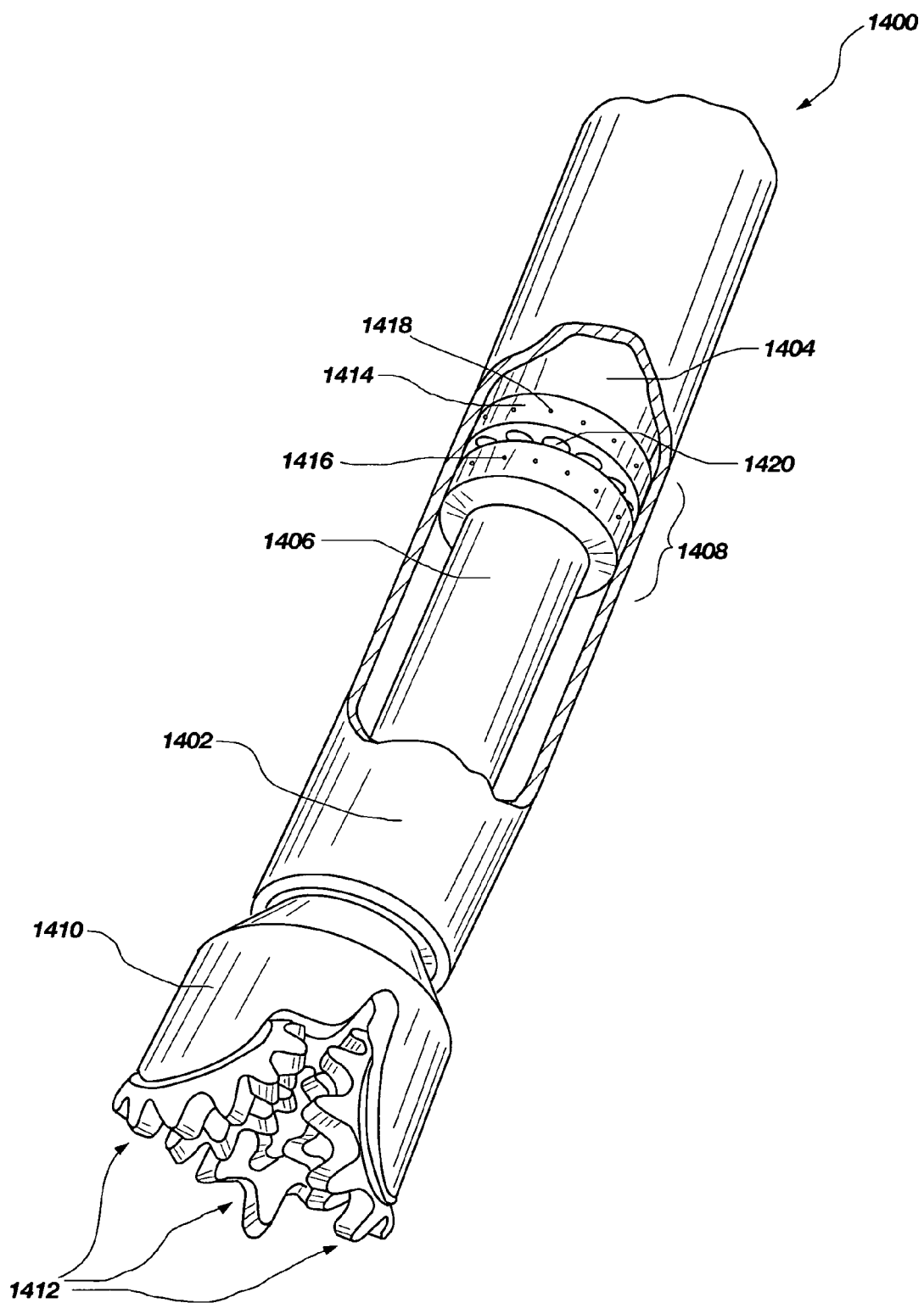
FIG. 14 is a schematic isometric partial cross-sectional view of a subterranean drilling system including any of the disclosed bearing apparatus embodiments.

Any of the embodiments for bearing apparatuses discussed above may be used in a subterranean drilling system. FIG. 14 is a schematic isometric partial cross-sectional view of a subterranean drilling system 1400 according to one embodiment of the present invention that uses a thrust-bearing apparatus. The subterranean drilling system 1400 includes a housing 1402 enclosing a downhole drilling motor 1404 (i.e., a motor, turbine, or any other device capable of rotating an output shaft) that is operably connected to an output shaft 1406. A thrust-bearing apparatus 1408 is operably coupled to the downhole drilling motor 1404. The thrust-bearing apparatus 1408 may be configured as any of the previously described thrust-bearing apparatus embodiments. A rotary drill bit 1410 configured to engage a subterranean formation and drill a borehole is connected to the output shaft 1406. The rotary drill bit 1410 is shown as a roller cone bit including a plurality of roller cones 1412. However, other embodiments of the present invention may utilize different types of rotary drill bits, such as so-called "fixed cutter" drill bits. As the borehole is drilled, pipe sections may be connected to the subterranean drilling system 1410 to form a drill string capable of progressively drilling the borehole to a greater depth within the earth.

The thrust-bearing apparatus 1408 includes a stator 1414 that does not rotate and a rotor 1416 that is attached to the output shaft 1406 and rotates with the output shaft 1406. The stator 1414 may include a plurality of circumferentially spaced bearing segments 1418 secured using retention elements 1420 (e.g., pins, interference-fit pins, threaded fasteners, etc.), as previously described such as with respect to the thrust-bearing assembly 100 shown in FIG. 1. The rotor 1416 may include a plurality of bearing elements (not shown) such as shown in the thrust-bearing assembly (i.e., rotor) 1002 shown in FIG. 10.

In operation, drilling fluid may be circulated through the downhole drilling motor 1404 to generate torque and effect rotation of the output shaft 1406 and the rotary drill bit 1410 attached thereto so that a borehole may be drilled. A portion of the drilling fluid is also used to lubricate opposing bearing surfaces of the stator 1414 and rotor 1416.

Although the present invention has been disclosed and described by way of some embodiments, it is apparent to those skilled in the art that several modifications to the described embodiments, as well as other embodiments of the present invention are possible without departing from the spirit and scope of the present invention. Additionally, the words "including" and "having," as used herein, including the claims, shall have the same meaning as the word "comprising."

The invention claimed is:

1. A bearing assembly, comprising:
a support ring including a plurality of recesses and at least one opening, the support ring further including at least one wall partially defining at least one of the recesses, the at least one wall including a through slot extending therethrough;
a plurality of bearing elements, each of the bearing elements positioned generally within a corresponding one of the recesses, at least one of the bearing elements including at least one groove exposed through the through slot in the at least one wall of the support ring; and
at least one retention element positioned generally within the at least one opening and adjacent to the at least one groove.

2. The bearing assembly of claim 1 wherein the at least one retention element is interference fit with the at least one of the bearing elements.

3. The bearing assembly of claim 1 wherein the at least one retention element is interference fit with the at least one of the bearing elements and the support ring.

4. The bearing assembly of claim 1 wherein the at least one groove is in substantially registry with the at least one opening.

5. The bearing assembly of claim 1 wherein:
the at least one opening comprises two openings; and
the at least one groove comprises two grooves, each of the two grooves being in substantially registry with a corresponding one of the two openings.

6. The bearing assembly of claim 1 wherein the at least one retention element comprises a pin that is interference fit with the at least one of the bearing elements.

7. The bearing assembly of claim 6 wherein the interference fit is a force fit or a shrink fit.

8. The bearing assembly of claim 1 wherein the at least one retention element is positioned between circumferentially-adjacent bearing elements of the plurality of bearing elements.

9. The bearing assembly of claim 1 wherein the at least one retention element is positioned between two circumferentially-adjacent bearing elements of the plurality of bearing elements and retains each of the two circumferentially-adjacent bearing elements on the support ring.

10. The bearing assembly of claim 1 wherein the at least one retention element is positioned between two circumferentially-adjacent bearing elements of the plurality of bearing elements and retains only one of the two circumferentially-adjacent bearing elements on the support ring.

11. The bearing assembly of claim 1 wherein each of the bearing elements comprises a superhard compact.

12. The bearing assembly of claim 1 wherein the support ring extends about a thrust axis.

13. A bearing apparatus, comprising:
a first bearing assembly comprising:
a support ring including a plurality of recesses and at least one opening, the support ring further including at least one wall partially defining at least one of the recesses, the at least one wall including a through slot extending therethrough;
a plurality of first bearing elements each of which includes a first bearing surface, each of the first bearing elements positioned generally within a corresponding one of the recesses, at least one of the first bearing elements including at least one groove exposed through the through slot in the at least one wall of the support ring; and
at least one retention element positioned generally within the at least one opening and adjacent to the at least one groove; and
a second bearing assembly rotatable relative to the first bearing assembly, the second bearing assembly comprising a plurality of second bearing elements each of which includes a second bearing surface, the second bearing assembly positioned so that the second bearing surfaces generally oppose the first bearing surfaces.

14. The bearing apparatus of claim 13 wherein the first bearing assembly or the second bearing assembly is configured as a stator.

15. The bearing apparatus of claim 13 wherein the at least one retention element of the first bearing assembly is positioned between two circumferentially-adjacent first bearing elements of the plurality of first bearing elements and retains each of the two circumferentially-adjacent first bearing elements on the support ring.

16. The bearing apparatus of claim 13 wherein the at least one retention element of the first bearing assembly is positioned between two circumferentially-adjacent first bearing elements of the plurality of first bearing elements and retains only one of the two circumferentially-adjacent first bearing elements on the support ring.

17. A motor assembly for use in drilling subterranean formations, comprising:
- a motor operable to apply torque to a rotary drill bit, the motor operably coupled to a bearing apparatus, the bearing apparatus comprising:
  - a first bearing assembly comprising:
    - a support ring including a plurality of recesses and at least one opening, the support ring further including at least one wall partially defining at least one of the recesses, the at least one wall including a through slot extending therethrough;
    - a plurality of first bearing elements each of which includes a first bearing surface, each of the first bearing elements positioned generally within a corresponding one of the recesses, at least one of the first bearing elements including at least one groove exposed through the through slot in the at least one wall of the support ring; and
    - at least one retention element positioned generally within the at least one opening and adjacent to the at least one groove; and
  - a second bearing assembly rotatable relative to the first bearing assembly, the second bearing assembly comprising a plurality of second bearing elements each of which includes a second bearing surface, the second bearing assembly positioned so that the second bearing surfaces generally oppose the first bearing surfaces.

18. The motor assembly of claim 17 wherein the first bearing assembly or the second bearing assembly is configured as a stator.

19. The motor assembly of claim 17 wherein the at least one retention element of the first bearing assembly is positioned between two circumferentially-adjacent first bearing elements of the plurality of first bearing elements and retains each of the two circumferentially-adjacent first bearing elements on the support ring.

20. The motor assembly of claim 17 wherein the at least one retention element of the first bearing assembly is positioned between two circumferentially-adjacent first bearing elements of the plurality of first bearing elements and retains only one of the two circumferentially-adjacent first bearing elements on the support ring.

* * * * *